United States Patent
Iyoki

(10) Patent No.: US 6,747,754 B1
(45) Date of Patent: Jun. 8, 2004

(54) IMAGE PROCESSING APPARATUS AND ITS STATUS INFORMATION NOTIFYING METHOD

(75) Inventor: Yutaka Iyoki, Kawasaki (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 0 days.

(21) Appl. No.: 09/458,962

(22) Filed: Dec. 10, 1999

(30) Foreign Application Priority Data

Jul. 22, 1999 (JP) .......................................... 11-207318

(51) Int. Cl.⁷ .................... G06F 15/00; G06F 15/16; H06K 1/11
(52) U.S. Cl. ..................... 358/1.15; 709/219; 709/217; 709/206; 361/798
(58) Field of Search ................................ 709/219, 206, 709/217; 358/1.15; 380/287; 361/798

(56) References Cited

U.S. PATENT DOCUMENTS

| | | | | |
|---|---|---|---|---|
| 6,125,186 A | * | 9/2000 | Saito et al. | 380/287 |
| 6,209,029 B1 | * | 3/2001 | Epstein et al. | 709/219 |
| 6,230,189 B1 | * | 5/2001 | Sato et al. | 709/206 |
| 6,289,371 B1 | * | 9/2001 | Kumpf et al. | 709/203 |
| 6,539,422 B1 | * | 3/2003 | Hunt et al. | 709/217 |
| 6,549,423 B1 | * | 4/2003 | Brodnick | 361/798 |

FOREIGN PATENT DOCUMENTS

| | | |
|---|---|---|
| JP | 10-79826 | 3/1998 |
| JP | 10124418 | 3/1998 |
| JP | 10124418 | 5/1998 |
| JP | 10269039 | 10/1998 |
| JP | 11031114 | 2/1999 |
| JP | 11184784 | 7/1999 |
| WO | 97/38510 | 10/1997 |

OTHER PUBLICATIONS

English Language Abstract and English translation of a portion of JP 10–269039.
English Language Abstract of JP 11–031114.
English Language Abstract of JP 11–184784.
English Language Abstract of JP 10–124418.
English Language Abstract of JP 10–79826.

* cited by examiner

Primary Examiner—Kimberly Williams
Assistant Examiner—Saeid Ebrahimi
(74) Attorney, Agent, or Firm—Greenblum & Bernstein, P.L.C.

(57) ABSTRACT

A multi-function system boots up a WWW server in which an applet is embedded. When a browser, which is executed on PCs, requests an HTTP file, the multi-function system transfers the HTML file and the applet. The browser executes the applet. The applet opens a TCP socket and starts communications between the multi-function and the applet. A status information obtaining section of the multi-function system obtains a status of each section of the multi-function system in response to a request from the applet, and the multi-function system notifies the applet of status information. The applet displays the status of each section. This makes it possible to send notification of the status of each section to PCs.

9 Claims, 11 Drawing Sheets

IMAGE PROCESSING APPARATUS AND ITS STATUS INFORMATION NOTIFYING METHOD

BACKGROUND OF THE INVENTION

1. Field of the Invention

The present invention relates to an image processing apparatus and its status information notifying method.

2. Description of the Related Art

Conventionally, an image input/output apparatus, which has a printer, a copy machine, a scanner, a facsimile apparatus, etc., mounted thereon, and which is so called Printer Copier, Fax Copier, Multi Function System, Multi-Function Station, (hereinafter referred to as multi-Function System) is put on the market. This multi-function system is connected to a Local Area Network (hereinafter referred to as LAN), and shared among a plurality of PCs, which is also connected to LAN.

For transmitting statuses of the respective sections such as print starting and ending, a paper jam, paper-out condition, non-arrival of facsimile, etc., to PC by use of the multi-function system, a special software is executed on PC, and each status is received and transmitted between the multi-function system and PC using the special software.

In order to perform the status transmission from the multi-function system to PC, the special software must be installed onto each PC. For this reason, when the multi-function system is set up, it is necessary to install the special software onto each PC. Also, at the time of exchanging the multi-function system or updating the function of the multi-function system, the special software must be installed again. Thus, in the conventional multi-function system, a significant burden is placed on the maintenance thereof.

SUMMARY OF THE INVENTION

The present invention has been made in consideration of the above-mentioned problem, it is an object of the present invention to provide an image processing apparatus, which is capable of a status of each section to a terminal without installing a special software onto the terminal, and to provide its status information informing method.

In order to solve the above object, according to the present invention, there is provided an image input/output apparatus mounting sections, which execute at lest one of image forming processing, image scanning processing and image communication processing. And, the image/output apparatus publishes a hypertext, which has an applet embedded therein, to an outer terminal, and communications with said applet, which is executed by a browser on said outer terminal to which the hypertext is opened. Then, the apparatus transmits the status information collected from each section of the apparatus to the outer terminal and the applet notifies the status information at the outer terminal.

Also, according to the present invention, there is provided a method for notifying status information of each section of an image input/output apparatus mounting sections, which execute at lest one of image forming processing, image scanning processing and image communication processing. In the above method, a hypertext, which has an applet embedded therein, is published to an outer terminal. Then, the apparatus communicates with the applet that is executed by a browser on said outer terminal to which the hypertext is opened. The apparatus transmits the status information collected from each section of the apparatus is transmitted to the outer terminal, and the applet notifies the status information at the outer terminal.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

Embodiments of the present invention will now be specifically explained with reference to the accompanying drawings.

(First Embodiment)

Figure 1:
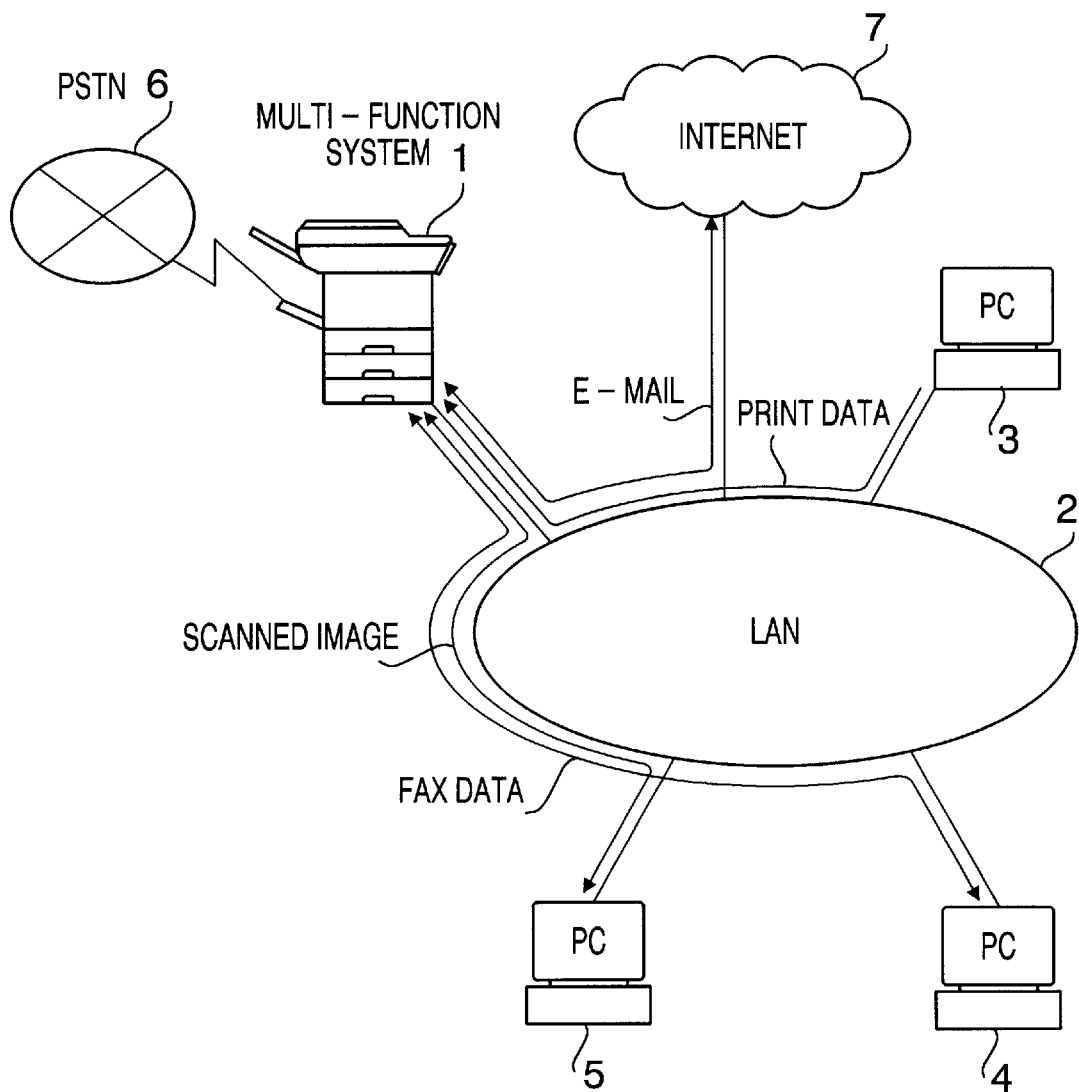
FIG. 1 is a conceptual view showing a network where a multi-function system according to a first embodiment of the present invention operates.

FIG. 1 is a conceptual view showing a network where a multi-function system according to a first embodiment of the present invention operates.

Multi-function system 1 is connected to LAN 2 and shared among PCs 3 to 5 connected to the same LAN 2. LAN 2 is constructed by, for example, Ethernet. Print data is transmitted to multi-function system 1 by PCs 3 to 5 through this LAN 2, and printed by multi-function system 1. Also, multi-function system 1 transmits an image, which is obtained by scanning an original, to PCs 3 to 5. Multi-function system 1 further transmits facsimile (FAX) data received through PSNT 6 to PCs 3 to 5. On the contrary, FAX data is transmitted from PCs 3 to 5 to multi-function system 1, and this FAX data is transmitted from multi-function system 1 to PSTN 6.

Moreover, multi-function system 1 has an Internet Facsimile (IFAX) function. IFAX is disclosed in U.S. Pat. No. 5,881,233, etc. Multi-function system 1 appends an image, which is obtained by scanning the original, to e-mails. Also, multi-function system 1 converts FAX data received through PSTN 6 to an e-mail format, and then sends these e-mails to Internet 7. It is of course that these e-mails are transmittable to PCs 3 to 5 through LAN 2.

Further, multi-function system 1 can receive emails through LAN 2 and Internet 7. Multi-function system 1 prints the image appended to the text part of the received e-mail and the image appended to the data part thereof. Multi-function system 1 converts the received e-mail to a format of FAX data, allowing the converted data to be transmitted to the other facsimile apparatus.

This first embodiment relates to the point in which each PC in the aforementioned network is informed of a change in the status of each section of multi-function system 1.

Figure 2:
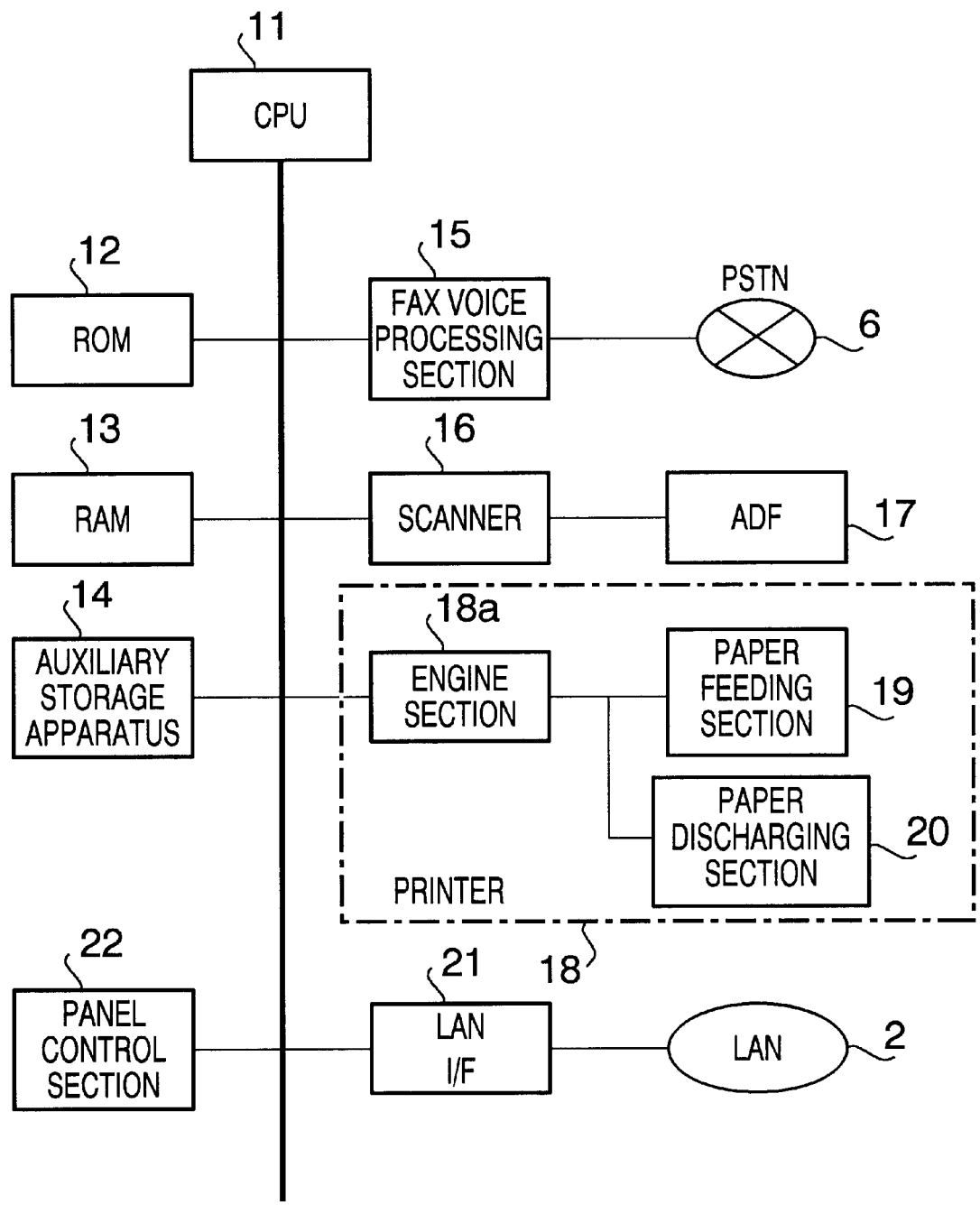
FIG. 2 is a hardware block diagram showing the multi-function system according to the first embodiment of the present invention.

FIG. 2 is a hardware block view showing the multi-function system 1 according to the first embodiment of the present invention. CPU 11 executes a programs multi-function system 1 and controls the entirety of the apparatus. ROM 12 stores the program, which is executed by CPU 11.

RAM 13 has a work area where the program is executed, and a buffer area where various kinds of data such as e-mails, image files, etc. are temporarily stored.

Auxiliary storage apparatus 14 stores an HTML file group.

FAX and voice processing section 15 modulates FAX data and a voice, and outputs modulated data to PSTN 6, and demodulates modulated data received from PSTN 6 to FAX data and voice data.

Scanner 16 scans an original, and obtains image data. Scanner 16 is provided with auto document feeder (ADF) 17, which continuously supplies a plurality of originals.

Printer 18 prints various kinds of received image data. Printer 18 has paper feeding section 19, which feeds recording paper stored in a cassette to an engine section 18a, and paper discharging section 20, which discharges recording paper printed by engine section 18a to a discharge tray.

LAN interface 21 executes procedures, which are necessary for receiving and transmitting data on LAN 2.

Panel control section 22 has dial keys and a touch panel, and receives operator's operations such as a specification of destination, an instruction of transmission start, etc.

Figure 3:
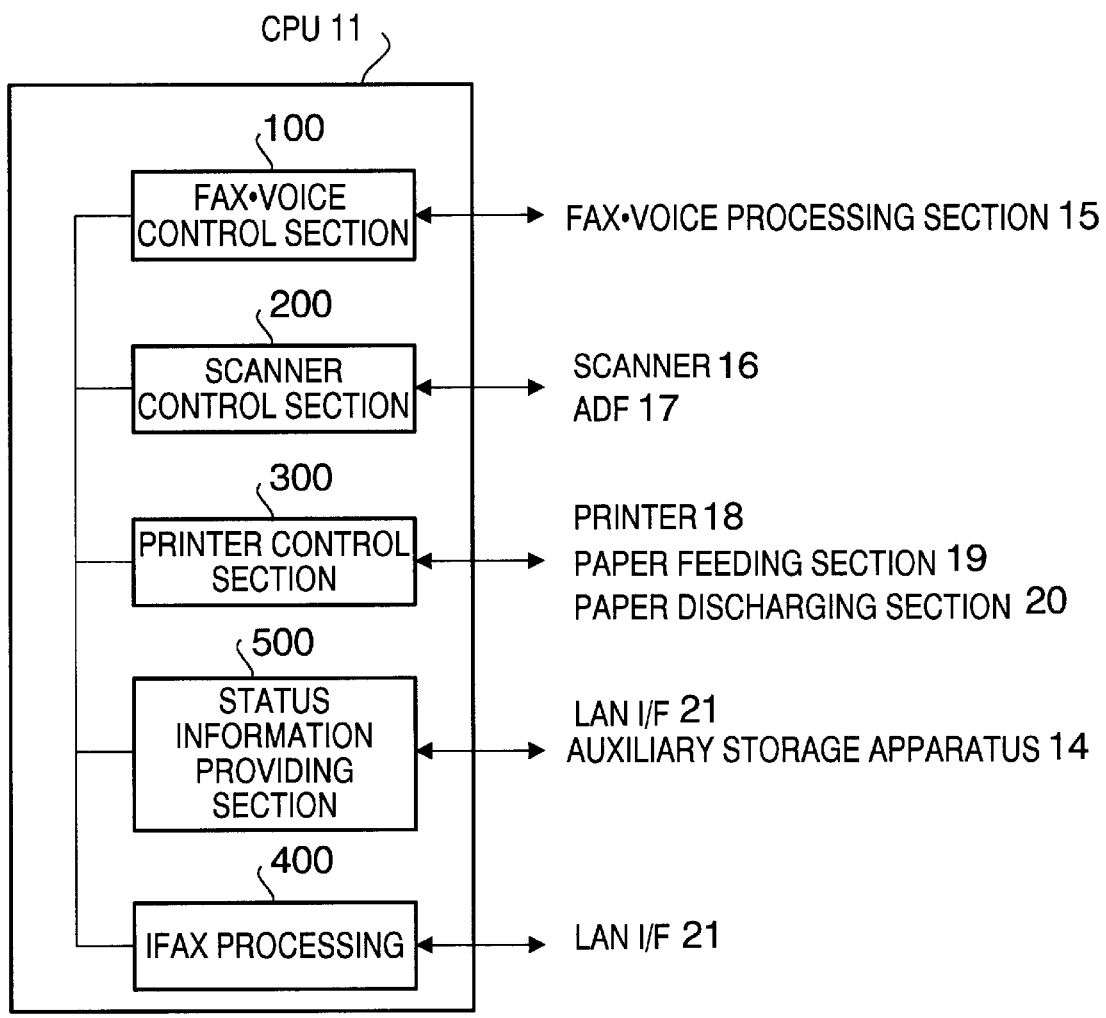
FIG. 3 is a block diagram showing the functions of the multi-function system according to the first embodiment of the present invention.

ROM 12 has a program, and CPU 11 executes the program. Functions resultantly constructed will be explained as follows. FIG. 3 is a block diagram showing the functions of the multi-function system according to the first embodiment.

Multi-function system 1 comprises FAX voice control section 100, scanner control section 200, and printer control section 300, and controls the respective control sections of FAX voice processing section 15, scanner 16, ADF 17, printer 18, paper feeding section 19, and paper discharging section 20.

Multi-function system 1 also comprises an IFAX processing section 400. This IFAX processing section 400 receives and transmits e-mails using LAN interface 21 through LAN 2. Namely, IFAX processing section 400 receives the e-mails from a sender, and prints it using printer 18. At this time, if an image file is appended to the e-mail, the content of the image file is printed by printer 18. While, IFAX processing section converts imaged data obtained by scanner 16 to e-mail and transmits it.

More specifically, scanner control section 200 sends raw image data (for example, bit map data), which is scanned by scanner 16, to IFAX processing section 400. In IFAX processing section 400, a compression and depression section compresses row image data by unit of a compression method such as MH, and obtains compression files. The compression is carried out by one page of original. These compression files are converted to one TIFF (Tagged Image File Format) file. This TIFF file is appended to a multi-part mail in accordance with, for example, MIME (Multipurpose Internet Mail Extension).

Also, IFAX processing section 400 opens the TIFF file appended to the received e-mail. The compression and decompression section decompresses the compressed file included in this TIFF file, and obtains raw image. IFAX processing section 400 sends raw image data to printer control section 300. Printer control section 300 makes printer 18 to print raw image data.

Multi-function system 1 comprises status information providing section 500. Status information providing section 500 collects status information from multi-function system 1 such as CPU 11, FAX voice processing section 15, scanner 16, ADF 17, printer 18, paper feeding section 19, paper discharging section 20, etc., provided in multi-function system 1, and provides status information to an outer section through LAN interface 21 and LAN 2.

Figure 4:
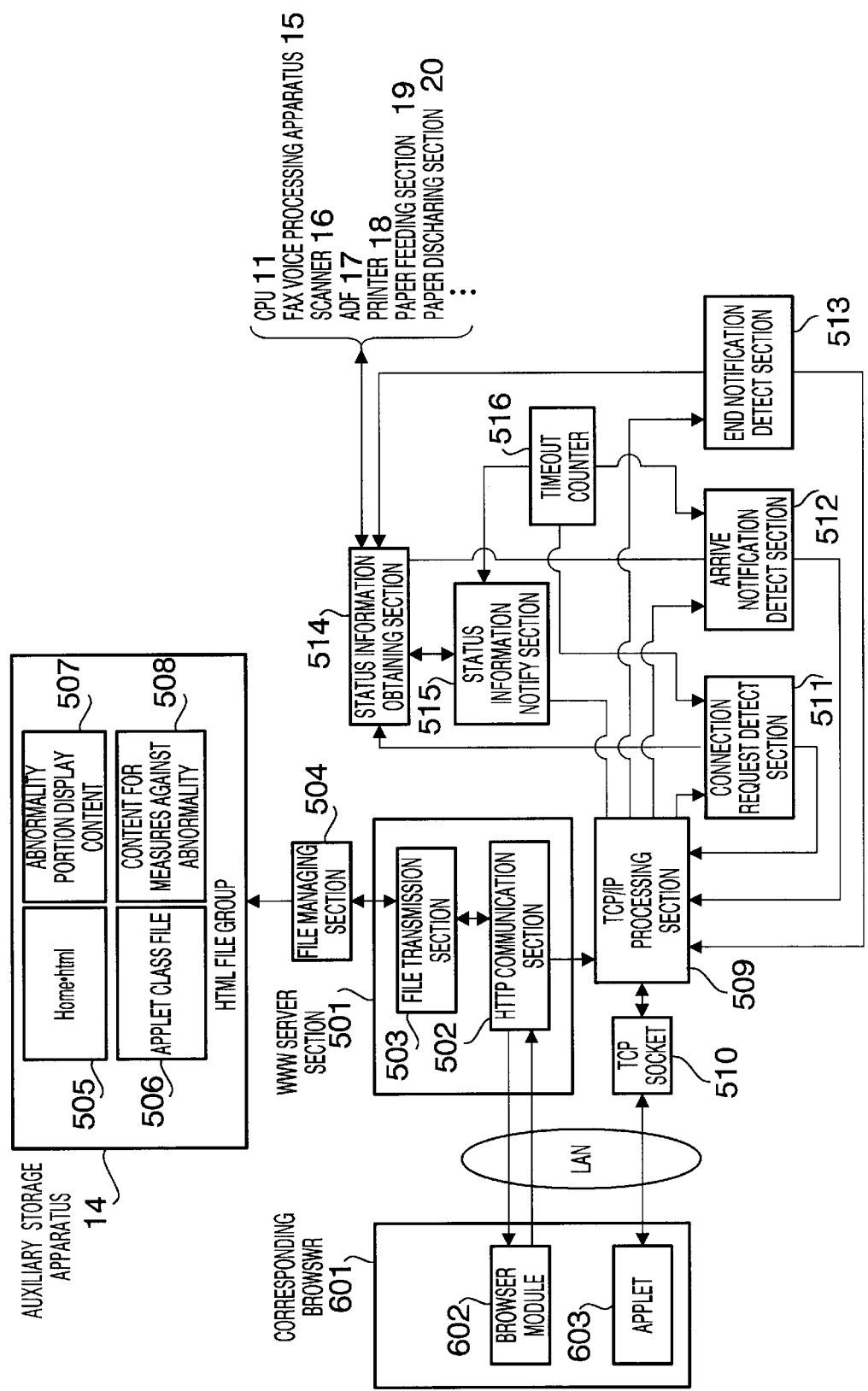
FIG. 4 is a block diagram showing the functions of a status information providing section of the multi-function system according to the first embodiment of the present invention.

A detailed explanation of status information providing section 500 will be given as follows. FIG. 4 is a block diagram explaining the functions of the status information providing section of the multi-function system according to the first embodiment.

Status information providing section 500 has WWW server section 501. This WWW server section 501 comprises HTTP communication section 502 and file transmission section 503.

HTTP communication section 502 performs communications between browser module 602 of Java (registered trademark)—acceptable browser 601, which is executed by PCs 3 to 5, and HTTP communication section 502 in accordance with HTTP (hypertext transfer protocol). File transmission section 503 recognizes a file command from PCs 3 to 5, and receives a file, to which the file request is issued, from file managing section 504, and sends it to HTTP communication section 502.

File managing section 504 manages the HTML file group stored in auxiliary storage apparatus 14, and sends the HTML file to file transmission section 503 in response to the request from file transmission section 503. The HTML file group comprises Home.html file 505, which is positioned at the top of the hierarchy of the home page, applet class file 506, abnormal portion display content file 507, and content file 508 for measures against abnormality.

Also, status information providing section 500 has TCP/IP processing section 509. TCP/IP processing section 509 opens TCP socket 510 so as to perform communications between applet 603 executed by Java-acceptable browser 601 of PCs 3 to 5, and TCP/IP processing section 509 in accordance with HTTP. A message received by this TCP/IP processing section 509 is sent to connection request detect section 511, which detects a connection request from applet 603, arrive notification detect section 512, which detects arrive notification from applet 603, and end notification detect section 513, which detects an end notification from applet 603.

Moreover, status information providing section 500 has status information obtaining section 514. The status information obtaining section 514 obtains status information from each section multi-function system 1 such as CPU 11, FAX voice processing section 15, scanner 16, ADF 17, printer 18, paper feeding section 19, paper discharging section 20, etc. periodically or when necessary. Status information informing section 515 sends obtained status information to TCP/IP processing section 509. Timeout counter 516 is connected to connection request detect section 511, arrive notification detect section 512, and status information informing section 515.

Next, the following will explain status information providing processing of the above-configured multi-function system 1 according to the first embodiment.

Figure 5:
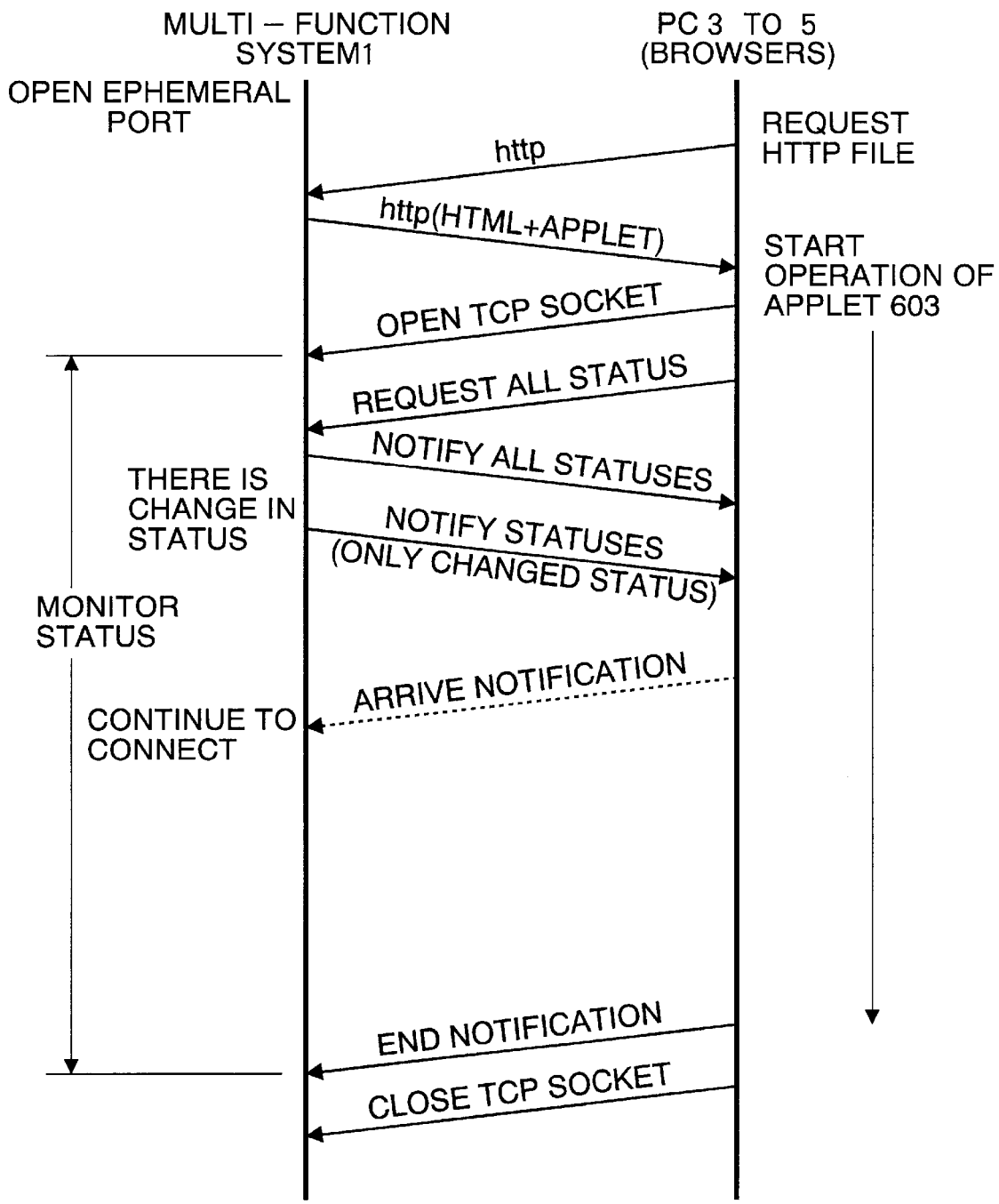
FIG. 5 is a sequence view showing communication procedures performed between the multi-function system according to this embodiment and PCs.

Communications between multi-function system 1 and PCs 3 to 5 will be explained. FIG. 5 is a sequence view showing procedures of communications performed between the multi-function system according to the above embodiment and PCs.

When the browser module 602 of the Java acceptable browser 501 accesses the WWW server, which is published by the multi-function system 1, the browser module 602 requests the WWW server section 501 to transfer the Home.html file 505. The file transmission section 503 detects this request, and requires the Home.html file 505 of the file managing section 504. The file managing section 504 sends the Home.html file 505 to the file transmission section 503. The file transmission section 503 transmits the Home.html file 505 to the HTTP communication section 502 and the browser module 602. The browser module 602 displays the Home.html file on the screens of PCs 3 to 5.

Figure 6:
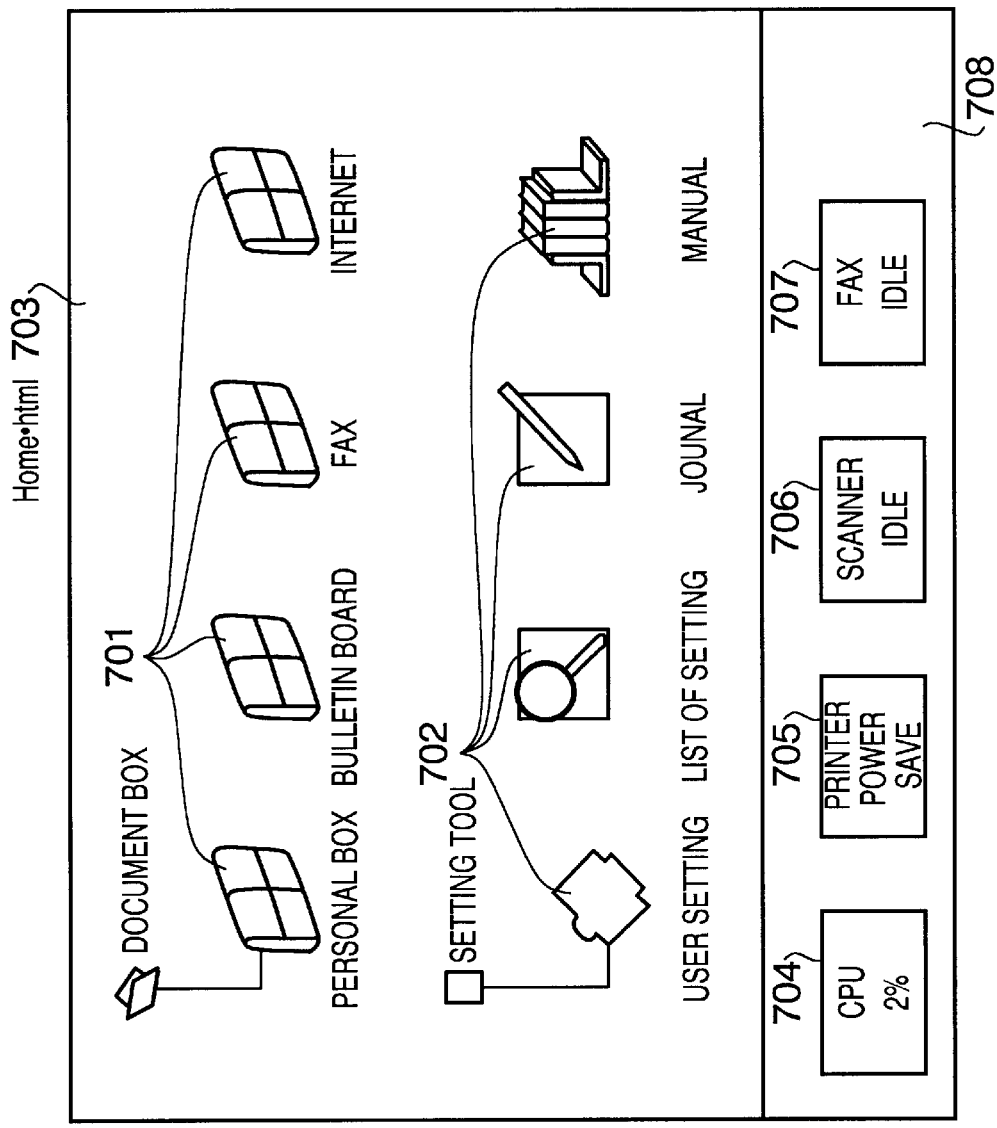
FIG. 6 is a view showing the content of Home.html of the multi-function system according to the first embodiment of the present invention.

FIG. 6 is a view showing the content of Home.html of the multi-function system according to the first embodiment of the present invention. The content of the Home.html file 505 comprises information icon 701, which serves as an entrance to access to various kinds of information, a main frame section 703, which includes setting icon 702 for connecting various kinds of setting tools, and applet frame section 708, which displays status information 704 to 707 of the respective sections. In this applet frame section 708, a link is pasted to the applet class file 506 stored in the auxiliary storage apparatus 14. The browser module 602 reads applet class file 506 to which the link is pasted simultaneously when reading the Home.html file 505. Java acceptable browser 601 opens the applet class file 506, so that the applet 603 is operated on the Java acceptable browser 601. Applet 603 is thus embedded in the Home.html file.

The TCP/IP communication section 509 of multi-function system 1 opens an ephemeral port, and waits for a connection request from the applet 601. The applet 603 of the PCs 3 to 5 transmits to the connection request to the ephemeral port. In the multi-function system 1, the connection detect section 511 detects a connection request. Thereafter, the TCP socket 510 is opened therebetween. The applet 603 transmits a message, which requests all status information, to the multi-function system 1. When The TCP/IP processing section 509 of the multi-function system 1 receives the message, status information obtaining section 514 obtains status from all sections. The status information informing section 515 informs the applet 603 of obtained status information through the TCP/IP processing section 509.

Also, the status information obtaining section 514 periodically obtains status information of each section, and informs the applet 603 of only status information of the section where a change in status has occurred.

Moreover, the applet 603 transmit arrive notification to the TCP/IP processing section 509 periodically. In the multi-function system 1, arrive notification detect section 512 detects the arrive notification, and a connection between the multi-function system 1 and the applet 603 is continued.

When the applet 603 is in an end state, the applet 603 transmits an end notification to multi-function system 1. In the multi-function system 1, the end notification detect section 513 detects the end notification. Thereafter, the TCP socket 510 is closed.

Figure 7:
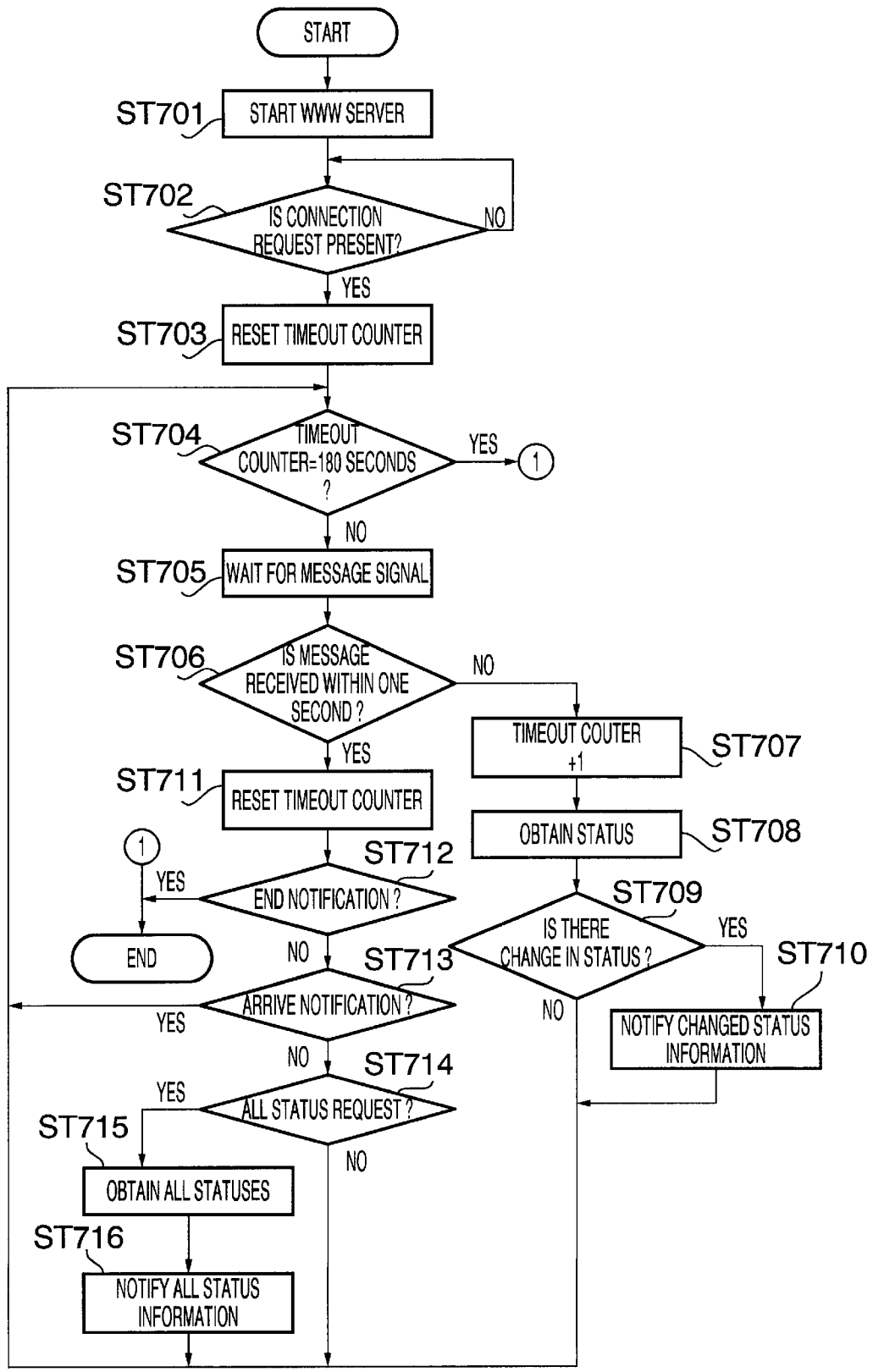
FIG. 7 is a flowchart showing each step at the time of providing status information in the multi-function system according to the first embodiment of the present invention.

Next, an operation of multi-function system 1 will be explained. FIG. 7 is a flowchart showing each step at the time of providing status information in the multi-function system according to the first embodiment.

Multi-function system 1 is started, and boots up the WWW server using the WWW server section 501 (step (hereinafter referred to as ST) 701). After that, the TCP/IP processing section 509 opens the ephemeral port, and waits for a connection request from PCs 3 to 5 (ST702).

The multi-function system 1 resets the timeout counter 516 when receiving the connection request (ST703). Next, it is determined whether or not the timeout counter 516 exceeds time-up time. If the timeout counter 516 exceeds no time-up time, the multi-function system 1 is set in a message reception waiting state (ST705).

The multi-function system 1 determines whether or not the message has been received within one second (ST706). If no message has been received within one second, the timeout counter 516 is incremented by one (ST707). Next, statuses with respect to all sections are obtained (ST708). Then, it is determined whether or not there is a change has occurred in the obtained statuses (ST709). If a change has occurred in the statuses, the applet 603 is informed of the changed status (ST710). Thereafter, processing goes to ST704.

While, if the message has been received within one second in ST706, the timeout counter 516 is reset (ST711), and it is determined whether or not the message is an end notification (ST712). If the message is the end notification, processing is ended.

If the message is not the end notification, it is determined whether or not the message is an arrive notification (ST713). If the message is the arrive notification, processing goes back to ST704. While, if the message is not the arrive notification, it is determined whether or not the message shows all status requests (ST714). If the message shows no all status requests, processing goes back to ST704.

If the message shows all status requests in ST714, all statuses are obtained (ST715), and all status information is sent to the applet 603(ST716). Thereafter, processing goes back to ST704.

By each processing of ST705, ST708 to ST710, the multi-function system 1 obtains the statuses of all sections at one second interval, and provides a notification of status information of the section where the change has occurred.

By each processing of ST714 to ST716, the multi-function system 1 obtains the statuses from all sections when receiving the message, which requests the statuses of all sections from the applet 603, and the applet 603 is informed of all status information.

Moreover, by each processing of ST704, ST707, and 711, when the timeout counter 516 counts up after receiving the message from the applet 603 finally, the multi-function system 1 ends the monitor of the status of each section.

Furthermore, in ST713,the multi-function system 1 continues the connection when receiving the arrive notification from the applet 603.

Figure 8:
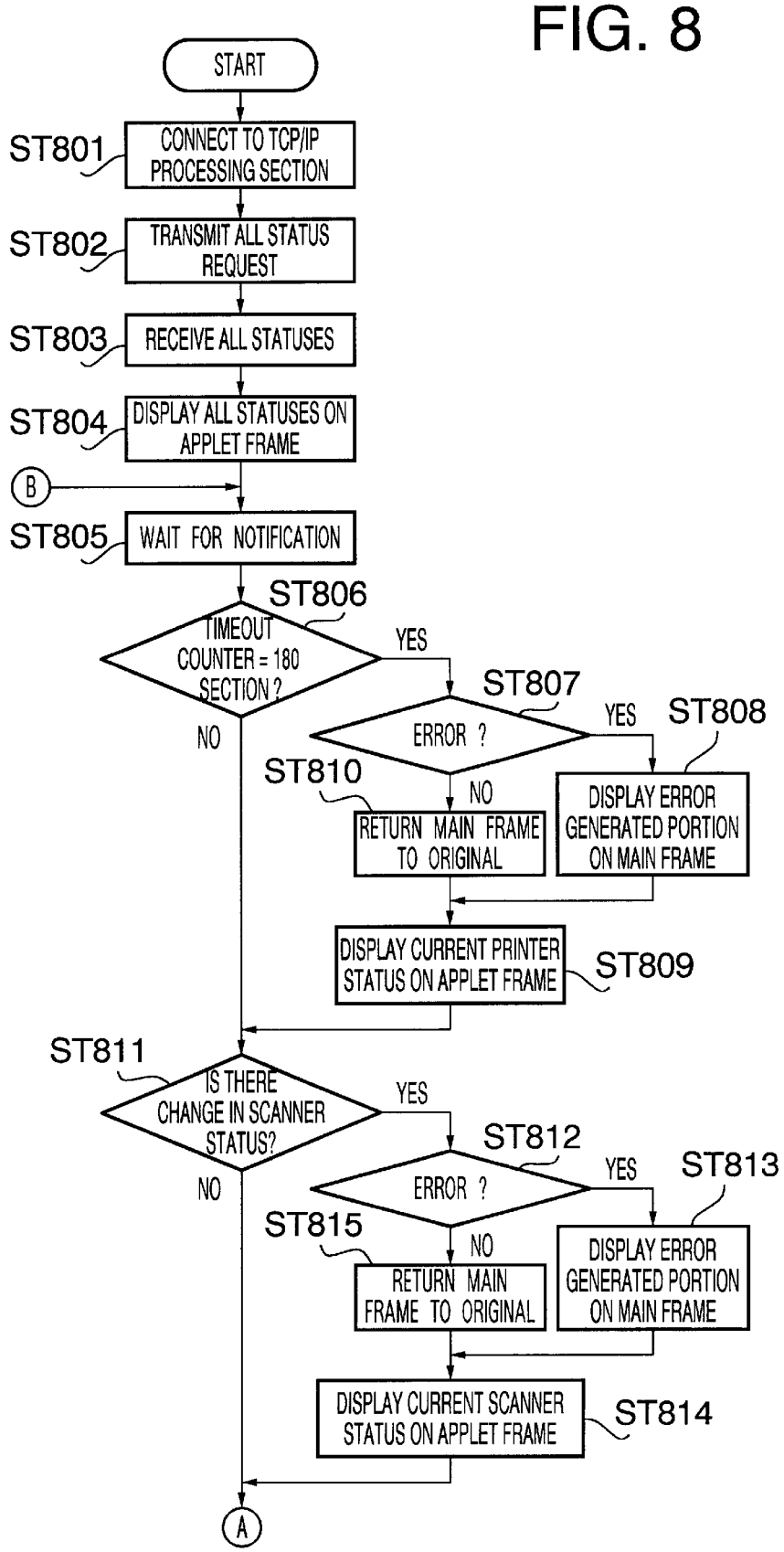
FIG. 8 is a flowchart showing each step of an applet operation according to the first embodiment of the present invention.
Figure 9:
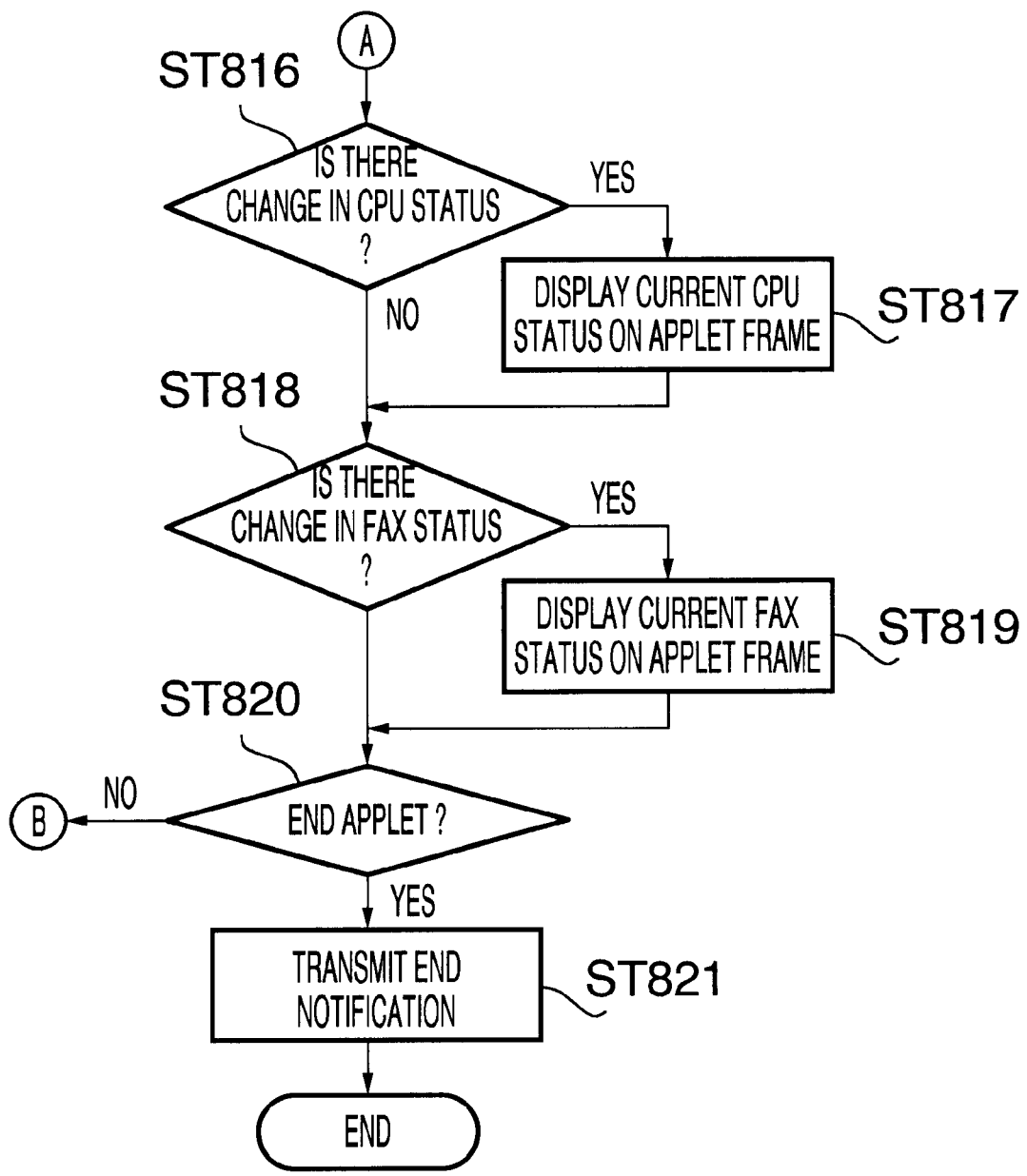
FIG. 9 is a flowchart showing each step of an applet operation according to the first embodiment of the present invention.

Next, the following will explain each step of the operation of the applet, which is operated by the PCs 3 to 5. FIGS. 8 and 9 are flowcharts showing each step of the operation of the applet according to the first embodiment.

When the multi-function system 1 gains access to a boot-up the WWW server, the browser module 602 of the Java acceptable browser 601, which is executed by the PCs 3 to 5, receives the Home.html file 505 and the applet class file 506. the Java acceptable browser 601 reads this applet class file 506, and executes the applet 603. The applet 603 operates as follows:

The applet 603 is connected to TCP/IP processing section 509 of the multi-function system 1 (ST801). Next, a message, which requests status information of all sections, is transmitted (ST802). All status information is received from the multi-function system 1 (ST803), and all status information 704 to 707 is displayed on the applet frame 708 shown in FIG. 6 (ST804).

Thereafter, the applet 603 is set in a notification waiting state (ST805). The applet 603 checks whether or not a change has occurred in the status of the printer 18 (including the paper feeding section 19, the paper discharging section 20) when receiving the notification (ST806). When a change has occurred in the status of printer 18, the applet 603 checks whether or not the content of notification is an error (ST807). When the content of notification is an error, the applet 603 instructs the browser module 602 to send a request of transferring the abnormal portion display content file 507, which shows a status abnormality generated portion, to the WWW server (ST808). This makes it possible to display the abnormal portion display content on Java acceptable browser 601. For example, as shown in FIG. 10, when paper jam occurs in the paper feeding section 19 of the printer 18, on the main frame 703, there is displayed a content, which is a perspective view 1001 showing the entirety of the multi-function system 1 and which includes a colored side cover portion 1002 where this paper jam has occurred.

Figure 10:
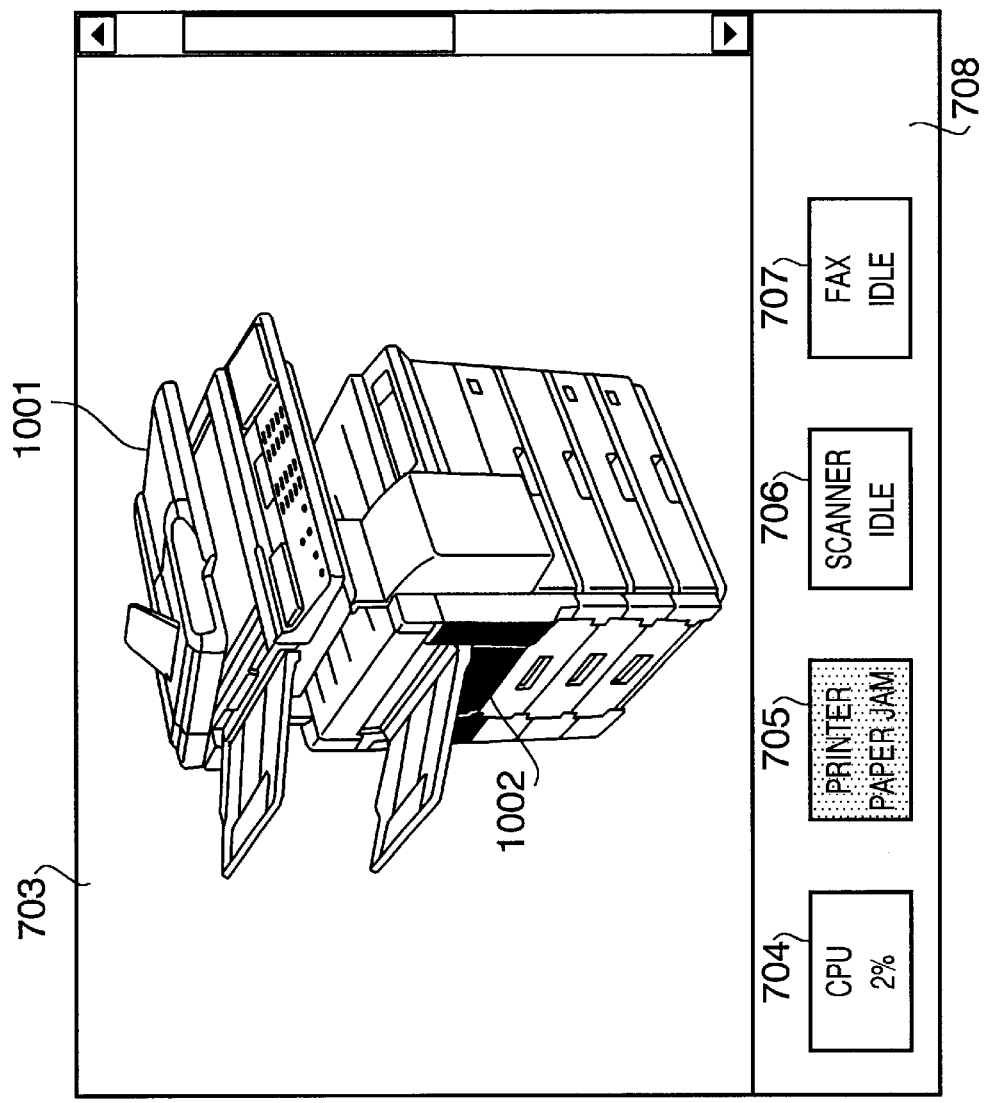
FIG. 10 is a view showing the contents showing a status abnormality according to the first embodiment of the present invention.

After that, the applet 603 updates status information 705 of the printer 18 shown in the applet frame 708, and displays the status "paper jam" of the current printer 18 as shown in FIG. 10 (ST809).

When the content of notification is not an error in ST807, the applet 603 judges that the printer 18 has returned to a normal state. Then, the applet 603 returns the display of the main frame 703 to the content of the Home.html file 505 as shown in FIG. 6 (ST810), and displays the status of the current printer 18 on the applet frame 708.

On the other hand, when no change in the status of the printer 18 has occurred in ST806, the applet 603 determines whether or not a change has occurred in the status of the scanner 16 (including the ADF 17) (ST811). When a change has occurred in the status of the scanner 16, the applet 603 determines whether or not the content of notification is an error (ST812). When the content of notification is an error, the applet 603 instructs the browser module 602 to send the WWW server a request for transferring abnormal portion display content file 507 (ST813). This makes it possible to display the abnormal portion display content on Java acceptable browser 601. After that, the applet 603 updates status information 706 of scanner 16 shown in the applet frame 708, and displays the status of the current scanner 16 (ST814).

When the content of notification is not an error in ST812, the applet 603 judges that the scanner 16 has returned to a normal state. Then, the applet 603 returns the display of the main frame 703 to the original (ST815), thereafter displaying the status of the current scanner 16 on the applet frame 708.

On the other hand, when no change in the status of the scanner 16 has occurred in ST806, the applet 603 determines whether or not a change has occurred in the status of the CPU 11 (ST816). When a change has occurred in the status of the CPU 11, the applet 603 updates status information 704 of the CPU 11 shown in the applet frame 708, and displays the status of the current CPU 11 (ST817).

Moreover, when no change has occurred in the status of the CPU 11 in ST816, the applet 603 checks whether or not a change in the status of the FAX voice processing section 15 has occurred (ST818). When a change has occurred in the status of the FAX voice processing section 15, the applet 603 updates status information 707 of the FAX voice processing section 15 shown in the applet frame 708, and displays the status of the current FAX voice processing section 15 (ST819).

When no change has occurred in the statuses of all sections or after the changed status is displayed, the applet 603 determines whether or not an end of applet has been instructed (ST820). When no end of the applet has been instructed, processing goes back to ST805. When the end of the applet has been instructed, the applet 603 transmits an end notification to the multi-function system 1 (ST821) and closes the TCP socket 510, and ends processing.

The applet 603 continues transmitting an arrive notification to the multi-function system 1 every 60 seconds during the operation.

As mentioned above, the applet 603 updates status information 704 to 707 of each section in accordance with the notification sent from the multi-function system 1. Also, the applet 603 detects that abnormality has been generated in each section from the notification, reads the content, which shows the abnormality generated portion, from the multi-function system 1, and displays it on the Java acceptable browser 601.

As explained above, the multi-function system 1 according to the first embodiment of the present invention has a WWW server mounted thereon together with image processing sections such as a printer, a scanner, FAX, etc. Namely, in the multi-function system 1, a WWW server, a printer, a scanner, FAX, LAN interface, a data storage, etc., are integrated into one apparatus. In such multi-function system 1, when the WWW server is booted up by the WWW server section 501 and an assess to the WWW server is obtained from the Java acceptable browser 601, which is executed by the PCs 3 to 5, the html file and the applet embedded in the html file are transferred. The multi-function system 1 establishes a communication line between the applet 603, which is executed on the Java acceptable browser 601, and the multi-function system 1. Then, the multi-function system 1 obtains the status of each section, and the applet 603 is informed of the obtained status information periodically or when necessary. The applet 603 makes the Java acceptable browser 601 to display status information. Since the applet is transmitted to the PCs 3 to 5 from the multi-function system 1, there is no need to install software, which is dedicated to communications with the multi-function system 1, in the PCs 3 to 5 if the Java acceptable browser 601 is installed therein. This makes it possible to inform the PCs 3 to 5 of the statuses of the respective sections of the multi-function system 1 and to display these statuses without installing software to the PCs 3 to 5 when the multi-function system 1 is newly connected to the LAN 2. This can be applied to exchanging the multi-function system 1. Also, at the time of updating the function of the multi-function system 1, for example, when G3/G4 facsimile function and Internet facsimile function are added to multi-function system 1 later, only the addition of the applet class file 506 and the updating thereof may be performed. This results in the considerable reduction of time and effort caused when the multi-function system 1 is set and exchanged and the function is updated.

Also, according to the multi-function system 1 according to the first embodiment, when abnormality of status is generated in multi-function system 1, applet 603 makes Java acceptable browser 601 to read the abnormal portion display content file 507, which shows the status abnormality generated portion, and to display it. This makes it possible to visually inform PC operators of the generation of status abnormality and the abnormality generated portion. As a result, the operators can know the generation of abnormality and easily grasp the abnormality generated portion at the same time.

(Second Embodiment)

Next, the multi-function system according to a second embodiment of the present invention will be explained.

When abnormality occurs in the status, the multi-function system according to the second embodiment, makes the content, which shows measures against the abnormality, to be displayed on the Java acceptable browser 601 of the PCs 3 to 5.

Figure 11:
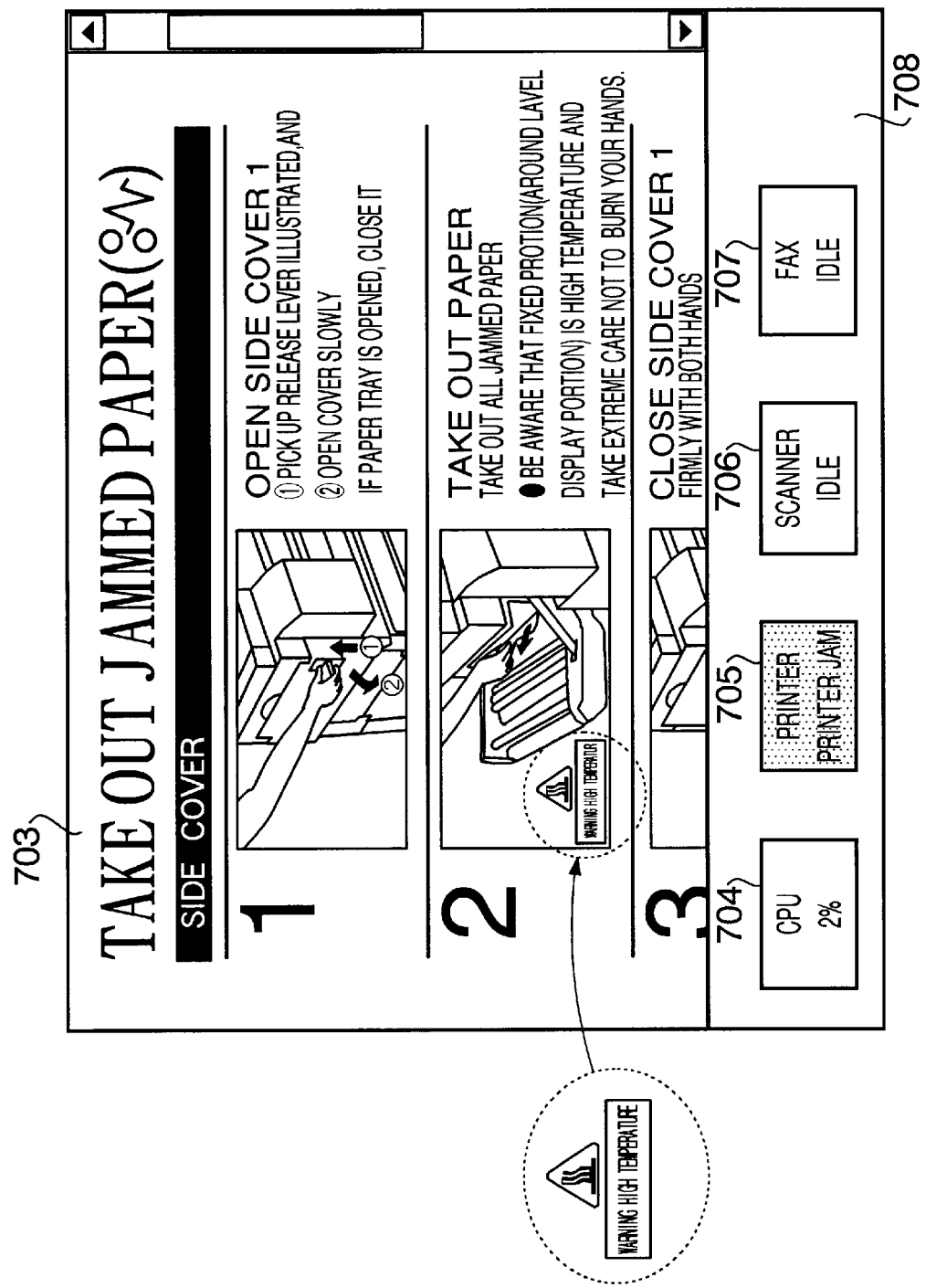
FIG. 11 is a view showing measures against the status abnormality according to the first embodiment of the present invention.

When a user clicks the content of the main frame 703 using a mouse after displaying the generation of paper jam as shown in FIG. 10 in the first embodiment, the applet instructs the browser module of Java acceptable browser to read content file 508 for measures against abnormality as shown in FIG. 11. The browser module displays this content on the main frame 703.

Similar to the first embodiment, the multi-function system according to the second embodiment sends the applet to PCs, and establishes the communication line between the applet, which is operated by PCs, and the multi-function system, and the multi-function system informs the applet of status information. This makes it possible to inform PC operators of the status of the multi-function system without installing the special software in PCs. Also, the applet makes the Java browser to read the abnormality generation content file and to display it. This makes it possible to inform PC operators of the abnormality generated portion of the multi-function system without installing the special software in PCs.

Moreover, according to the multi-function system of the second embodiment, the applet makes the Java browser to read the content file for measures against abnormality and to display it. This makes it possible to inform PC operators of measures against the status abnormality of the multi-function system without installing the special software in PCs. As a result, the operators can deal with the abnormality of the multi-function system speedily. In addition, the content file for measures against abnormality is stored in the auxiliary storage apparatus of the multi-function system. For this reason, only the content of the auxiliary storage apparatus of the multi-function system may be rewritten as the need for rewriting the content comes about in order to provide the newest measures to the operators.

As explained above, according to the present invention, the multi-function system publishes the WWW server in which the applet is embedded, performs communications with the applet, which is executed on the browser of the terminal connected to this WWW server. Then, the multi-function system transmits status information of each section to the applet, so that the applet is informed of the status. This eliminates the need for installing the software dedicated to the terminal, and makes it possible to largely reduce time and effort, which are necessary when the operator sets the image input/output apparatus and exchanges it.

The present invention is not limited to the above-explained embodiment. Though the above embodiment explained the multi-function system as an example, the present invention can be widely applied to the image input/output apparatus. In this case, the image input/output apparatus is one that performs at least one of image inputting and image outputting. The image inputting includes that the original is scanned by the scanner so as to obtain image data. The image outputting includes that the image is printed onto recording paper and that the image is transmitted to a receiver in accordance with the facsimile procedures. Moreover, the image inputting and outputting includes that the e-mail to which the image is appended is received and that the image is appended to the e-mail and that this e-mail is transmitted. Namely, the image input/output apparatus widely includes an image processing apparatus, an image forming apparatus, an image communication apparatus, an image scanning apparatus, etc. Specifically, the present invention includes a copy machine, a facsimile apparatus, a scanner section, a printer section, and an Internet facsimile apparatus. More specifically, in the case of the copy machine, the scanner and the printer section are mounted thereon. Also, in the case of the facsimile apparatus, the scanner, the printer section, and the facsimile communication section are mounted thereon. Moreover, in the case of the Internet facsimile apparatus, the scanner section and the printer section are mounted thereon, and the facsimile communication section is mounted thereon as required. In the case of the scanner and the printer, one section is of course mounted thereon.

In the above first and second embodiments, the contents showing, for example, abnormality generated portion or measures against abnormality, are open to public by WWW server section 501. However, the entirety or the part of these contents may be open to public by an outer WWW server. Also, these contents may be open to public in the outer terminal. In either case, the users can enjoy the advantage of the present invention in which there is no need to install software dedicated to the outer terminal.

This invention may be conveniently implemented using a conventional general purpose digital computer or microprocessor programmed according to the techniques of the present specification, as will be apparent to those skilled in the computer art. Appropriate software coding can readily be prepared by skilled programmers based on the techniques of the present disclosure, as will be apparent to those skilled in the software art. This invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical disks, CD-ROMs, and magneto-optical disks, ROMs, RAMs, EPROMs, EEPROMs, magnetic or optical cards, or any type of media suitable for storing electronic instructions.

The present invention is not limited to the above described embodiments, and various variations and modifications may be possible without departing from the scope of the present invention.

This application is based on the Japanese Patent Application No.HEI11-207318 filed on Jul. 22, 1999, entire content of which is expressly incorporated by reference herein.

What is claimed is:

1. An image processing apparatus comprising:
   a scanner configured to scan image data, the scanner comprising an operational section of the image processing apparatus;

a printer configured to print image data, the printer comprising an operational section of the image processing apparatus;

a memory configured to store a hypertext, the hypertext having an applet embedded therein;

a WWW corresponder configured to transmit the hypertext including the applet to a remote terminal when the hypertext is requested by the remote terminal;

a TCP/IP communicator configured to connect the remote terminal with the image processing apparatus when a connection request from the remote terminal is detected, the connection request being made by the applet embedded in the hypertext transmitted to the remote terminal; and a controller configured to transmit, to the remote terminal, status information regarding each operational section of the image processing apparatus, when a status request from the remote terminal is detected by the TCP/IP communicator.

2. An image processing apparatus having at least one of a printer, a scanner, and a facsimile as operational sections, the image processing apparatus comprising:

a memory configured to store a hypertext, the hypertext having an applet embedded therein;

a WWW corresponder configured to transmit the hypertext including the applet to a remote terminal when the hypertext is requested by the remote terminal;

a TCP/IP communicator configured to connect the remote terminal with the image processing apparatus when a connection request from the outer terminal is detected, the connection request being made by the applet embedded in the hypertext transmitted to the remote terminal;

a controller configured to transmit, to the remote terminal, status information regarding each operational section of the image processing apparatus, when a status request from the remote terminal is detected by the TCP/IP communicator; and said controller being further configured to check for a change of the status information regarding each operational section of the image processing apparatus at predetermined intervals, and to transmit updated status information regarding an operational section when a change has occurred.

3. The image processing apparatus according to claim 2, wherein the controller transmits updated status information only when a change has occurred.

4. An image processing apparatus having at least a printer as an operational section, the image processing apparatus comprising:

a memory configured to store a hypertext, the hypertext having an applet embedded therein;

a WWW corresponder configured to transmit the hypertext including the applet to a remote terminal when the hypertext is requested by the remote terminal;

a TCP/IP communicator configured to connect the remote terminal with the image processing apparatus when a connection request from the remote terminal is detected, the connection request being made by the applet embedded in the hypertext transmitted to the remote terminal;

a controller configured to transmit, to the remote terminal, status information regarding each operational section of the image processing apparatus, when a status request from the remote terminal is detected by the TCP/IP communicator; and said status information including information which indicates where in the printer a paper jam has occurred.

5. The image processing apparatus according to claim 4, wherein said status information further includes information which indicates how to remove the paper jam from the printer.

6. A method for transmitting status information about at least one operational section of an image processing apparatus, the image processing apparatus having at least one of a printer, a scanner, and a facsimile as a operational section, and a memory storing a hypertext which has an applet embedded therein, the method comprising:

transmitting the hypertext including the applet to a remote terminal when the hypertext is requested by the remote terminal;

connecting the remote terminal with the image processing apparatus when a connection request from the remote terminal is detected, the connection request being made by the applet embedded in the hypertext transmitted to the remote terminal;

transmitting, to the remote terminal, status information regarding each operational section of the image processing apparatus when a status request from the remote terminal is detected;

checking for a change of the status information regarding each operational section of the image processing apparatus at predetermined intervals;

transmitting updated status information regarding an operational section when a change has occurred.

7. The status transmitting method according to claim 5, wherein updated status information is transmitted only when a change has occurred.

8. A method for transmitting status information about at least a printer as an operational section of an image processing apparatus, a memory storing a hypertext which has an applet embedded therein, the method comprising:

transmitting the hypertext including the applet to a remote terminal when the hypertext is requested by the remote terminal;

connecting the remote terminal with the image processing apparatus when a connection request from the remote terminal is detected, the connection request being made by the applet embedded in the hypertext transmitted to the remote terminal; and transmitting, to the remote terminal, status information regarding each operational section of the image processing apparatus, when a status request from the remote terminal is detected;

wherein the information includes information which indicates where in the printer a paper jam has occurred.

9. The method according to claim 8, wherein the status information further includes information which indicates how to remote the paper jam from the printer.

* * * * *